Oct. 23, 1962 R. G. LAUCHER ET AL 3,059,426
THRUST REVERSER UTILIZING AFT END MECHANICAL BLOCKAGE
Filed March 22, 1957 10 Sheets-Sheet 1

FIG. 1

RICHARD G. LAUCHER,
KHALIL M. BUDGE,
ROBERT W. FALCONER,
DAVID H. BIENERT,
INVENTORS.

BY R.E. Jeanque

ATTORNEY

FIG. 2

RICHARD G. LAUCHER,
KHALIL M. BUDGE,
ROBERT W. FALCONER,
DAVID H. BIENERT,
INVENTORS.

BY R.E. Geauque

ATTORNEY

RICHARD G. LAUCHER,
KHALIL M. BUDGE,
ROBERT W. FALCONER,
DAVID H. BIENERT,
INVENTOR.

BY R. E. Geauque

ATTORNEY

Oct. 23, 1962 R. G. LAUCHER ET AL 3,059,426
THRUST REVERSER UTILIZING AFT END MECHANICAL BLOCKAGE
Filed March 22, 1957 10 Sheets-Sheet 7

RICHARD G. LAUCHER,
KHALIL M. BUDGE,
ROBERT W. FALCONER,
DAVID H. BIENERT,
INVENTOR.

BY R. E. Jeanque

ATTORNEY

RICHARD G. LAUCHER,
KHALIL M. BUDGE,
ROBERT W. FALCONER,
DAVID H. BIENERT,
INVENTOR.

BY R. E. Geauque

ATTORNEY

Oct. 23, 1962   R. G. LAUCHER ET AL   3,059,426
THRUST REVERSER UTILIZING AFT END MECHANICAL BLOCKAGE
Filed March 22, 1957   10 Sheets-Sheet 10

RICHARD G. LAUCHER,
KHALIL M. BUDGE,
ROBERT W. FALCONER,
DAVID H. BIENERT,
INVENTORS.

BY R.S. Seangue

ATTORNEY

United States Patent Office 3,059,426
Patented Oct. 23, 1962

3,059,426
THRUST REVERSER UTILIZING AFT END
MECHANICAL BLOCKAGE
Richard G. Laucher, Canoga Park, Khalil M. Budge, Van Nuys, Robert W. Falconer, Canoga Park, and David H. Bienert, Woodland Hills, Calif., assignors to The Marquardt Corporation, a corporation of California
Filed Mar. 22, 1957, Ser. No. 647,842
18 Claims. (Cl. 60—35.54)

This invention relates to a thrust reverser utilizing aft end mechanical blockage and more particularly to a thrust reverser for a turbojet engine which will not substantially affect normal or afterburner engine performance during thrust reversal.

Reverse thrust is utilized to spoil engine thrust during flight landing and taxiing in order to improve maneuverability and greatly reduce the landing speed and braking requirements for landing and taxiing. One present type of thrust reverser utilizes a plurality of reversing vanes which are moved over a peripheral opening in the side of the engine tail pipe and blockage means are utilized to direct the working fluid through the reversing vanes to obtain reverse thrust. In devices of this prior type, the peripheral opening is positioned in the tail pipe ahead of the exit nozzle and in order to maintain normal engine performance during thrust reversal, the open area of the peripheral opening should be scheduled with the closed area developed by the blockage means so that the effective area which the engine feels is the same as the area of the normal exit nozzle.

Another present form of thrust reverser, such as the clam shell type, utilizes movable elements to block the aft end of the engine and to simultaneously change the direction of thrust. However, these devices substantially increase the circumference of the engine at the aft end during normal operation and thus, present a substantial drag area and undesirable flow lines. Also, because of the construction of these devices, they are not readily adaptable to a variety of engine installations, are not adaptable to the use of turning vanes which give positive direction to reverse flow, are not adaptable to incorporation of fail safe features, and are not adaptable to shielding of reverse flow areas without regard to symmetry.

By the present invention, a thrust reverser is provided which utilizes mechanical blockage at the aft end of the engine and behind the exit nozzle, whether the nozzle is variable or not. In all forms of the invention, the blockage means comprises segments secured to a movable tail end section which surrounds the exit nozzle when the section is in its forward, stowed position. The tail section blockage segments and linkage therefor can be supported wholly by the engine structure or by independent aircraft structure or partly by both. In the stowed position, the tail section follows the contour of the outer surface of the engine to present minimum drag. When the tail section is moved rearwardly toward reversing position, the initial movement opens an area adjacent the end of the nozzle and thereafter the nozzle segments are moved downwardly by linkage means to increase the amount of blockage as the tail section moves to its rear extended position. In the extended position, the segments are in position to provide maximum blockage. The blocked area during blockage is always aft of the nozzle and larger than the nozzle. With the tail section in the stowed non-reversing position, the blockage segments are positioned substantially lengthwise of the engine and outside the exit nozzle so that the segments are not subject to high temperature and, therefore, special cooling is not required. In one embodiment of the invention, reversing vanes are connected to the forward side of the movable tail section so that the vanes will be located over the open areas resulting from aft movement of the tail section. Also, the reversing vanes can be eliminated in any of the forms by so shaping the surfaces defining the open area so that the exhaust gases are given a forward component. Another form of the invention utilizes the blockage segments as the secondary ejector wall during non-reversing operation, thereby saving weight and space. Further, the invention contemplates that the secondary ejector wall will be in the form of a variable ejector nozzle to obtain optimum thrust and cooling performance. The blockage segments are continually surrounded by the tail section and can be of trapezoidal shape without seals therebetween. The space existing between the segments during initial inward movement permit convenient scheduling of the blocked area with the position of the tail section and reduces the initial load on the linkage for the segments.

It is thus apparent that the thrust reverser will not effect normal or afterburner performance since blockage occurs over a larger area than the exit nozzle and behind the exit nozzle rather than forward of the nozzle and the engine feels the normal exit nozzle area. Thus the invention permits engine control by variations of the primary engine nozzle in the normal manner, so that the current design engine controls can control the engine during both normal and thrust reversing operations. Also, the movable tail section is shaped to provide minimum drag and can be incorporated in a wide variety of installations. Reversing vanes can be easily incorporated and shielding of reverse flow areas can be accomplished to protect any area exterior of the shielded areas. Because the linkage by which the segments are moved can be attached at any chosen point on the blockage segments, any failure of the control system for the thrust reverser will cause the engine exhaust to move the segments to either the non-reversing position or the reversed thrust position at the will of the design.

It is therefore an object of the present invention to provide a thrust reverser utilizing aft and mechanical blockage so that the engine feels the area of the exit nozzle and no modification of the engine controls is required for normal or thrust reversing operation.

Another object of the invention is to provide a thrust reverser utilizing segments carried by a movable tail section for blocking the aft end of the engine without substantially increasing the drag area of the engine or producing undesirable flow lines during normal operation, said thrust reverser being adaptable for use with various shapes and sizes of engines and being adaptable to incorporation of shielding means for shielding the reverse thrust at any desired locations.

Another object of the invention is to provide reversed thrust with gas direction controlled by various shields, deflectors, flow guides and turning vanes so that maximum efficiency of the efflux may be obtained and that wing, fuselage, pylon, nacelle, control, landing gear and empennage surfaces may be protected from hot gases.

A further object of the present invention is to provide a thrust reverser which utilizes aft end mechanical blockage for positive diversion of exhaust gases and which is suitable for incorporation of reversing vanes to give positive direction to the reverse flow.

A still further object of the invention is to provide a thrust reverser utilizing aft end mechanical blockage without interfering with the operation of the variable area exit nozzle of the engine.

Another object of the invention is to provide segments movable by linkages to block the aft end of an engine, said linkages being fail safe in either the reversing or non-reversing position and permitting full modulation of the reversed thrust.

Another object of the invention is to provide a combination thrust reverser and secondary ejection nozzle, said ejector nozzle being either fixed or variable.

These and other objects of the invention, not specifically set forth above, will become readily apparent from the accompanying description and drawings in which:

Referring to FIGURES 1–6, a first form of the invention is illustrated wherein the engine nacelle or cover has a tail end 25 and a support beam 26 is secured in any desired manner to the airframe structure. The beam is located above the exit nozzle 27 and extends aft of the end of the exit nozzle. Skin sections 28 cover opposite sides of the beam and extend to connect with the engine nacelle 29 to provide a minimum drag area with desirable flow lines. A tail section 30 is mounted for movement along the axial line of the engine by the beam 26 and in its forward, stowed position, the section 30 abuts the aft edge of nacelle 29. Skin sections 31 are located on opposite sides of beam 26 and connect with sections 28 and tail section 30, to form a low drag configuration, and skin section 32 closes the space between sections 31.

The beam 26 supports a pair of spaced, substantially U-shaped brackets 32' and 33' and legs 34 of each bracket extend on opposite sides of beam 26. The legs are secured to the beam by a plurality of bolts 35 passing through skin sections 28, cover members 36, legs 34 and the beam 26. A pair of channel shaped members 37 and 38 each have one side 39 secured to the bottom of both brackets 32' and 33' so that the open side of the channel members face one another. The other side 40 of member 37 forms a track for rollers 41 and the side 40 of member 38 forms a track for rollers 42. A pair of spaced plate members 43, 44 are connected at one end to tail section 30 and the end of each member extends into the space between the channel members 37, 38 so that rollers 41 are connected to member 43 and rollers 42 are connected with member 44. A shaft (not shown) extends between the forward rollers 41 and 42 and end 45 of actuator shaft 46 is connected to the shaft and separated from plate members 43 and 44 by suitable spacers on the shaft. Shaft 46 extends from one end of actuator 47 and the other end of the actuator is secured to band 48 located forward of exit nozzle 27. The actuator extends through an opening 49 in a portion of nacelle 29 covered by skin section 28 and comprises a reversible mechanical jack-screw driven by a rotating cable 50. Power devices, such as a compressor-bleed air motor 51, can be utilized to drive cable 50 to eliminate the need for a power source from the airplane.

As the actuator moves shaft 46 rearwardly, the tail section 30 will be moved bodily towards its rear, extended position while being continually supported by beam 26 and rollers 41, 42. An annular member 52 extends around the inner circumference of tail section 30 at the location of plate members 43, 44 and is secured to the inner surface of the section. Located at 120 degree increments from actuator 47 are two additional actuators 53 (see FIGURE 4) and each of these actuators are pivotally mounted by pin 54 to a bracket 55 secured to the exit nozzle 27 and band 48. Shaft 56 of each actuator 53 is pivotally connected by pin 57 to a bracket 58 secured to member 52 and each actuator is driven by cable 50 extending around the engine. Rotation of cable 50 causes extension of shafts 56 and synchronizes the action of actuator 47 and the two actuators 53 to assure symmetrical movement of tail section 30 as it is moved between forward, stowed position (FIGURES 1 and 3) and rearward, extended position (FIGURES 2 and 5) by shaft 46 and the two shafts 56.

The inner side of member 52 mounts a plurality of projections 59 and between each pair of projections 59 extends a pivot pin 60. Each of a plurality of trapezoidal shaped, blockage segments 61 has a pair of brackets 62 pivotally secured to one of the pins 60 so that the segments can move about the pins to block the aft end of the engine. The shape of the segments 61 permits the segments to become substantially perpendicular to the engine axis before the edges of the segments are next to each other. When the segments are in maximum blockage position, an opening 61' remains at the center of the tail section 30. The opposite side of each segment mounts a pair of spaced brackets 63 on its center line at a position spaced from the pin 60 which supports the segment. A pin 64 pivotally connects one end of a link 65 to each pair of brackets 63 and the other end of each link 65 terminates in a cross pin 66 which rides in a track formed by a channel member 67 having folded over sides 68 to retain pin 66 within the channel member while permitting the link 65 to pass between the sides and pivot about cross pin 66. The members 67 are of sufficient length to retain pins 66 during the full movement of tail section 30 to its stowed position and a stop 69 is located at the aft end of the track in each member 67 to stop the cross pin 66 during movement of the tail section rearwardly to extended position. Each stop 69 has a portion 70 secured to the aft end of the exit nozzle by bolts 71.

Figure 5:
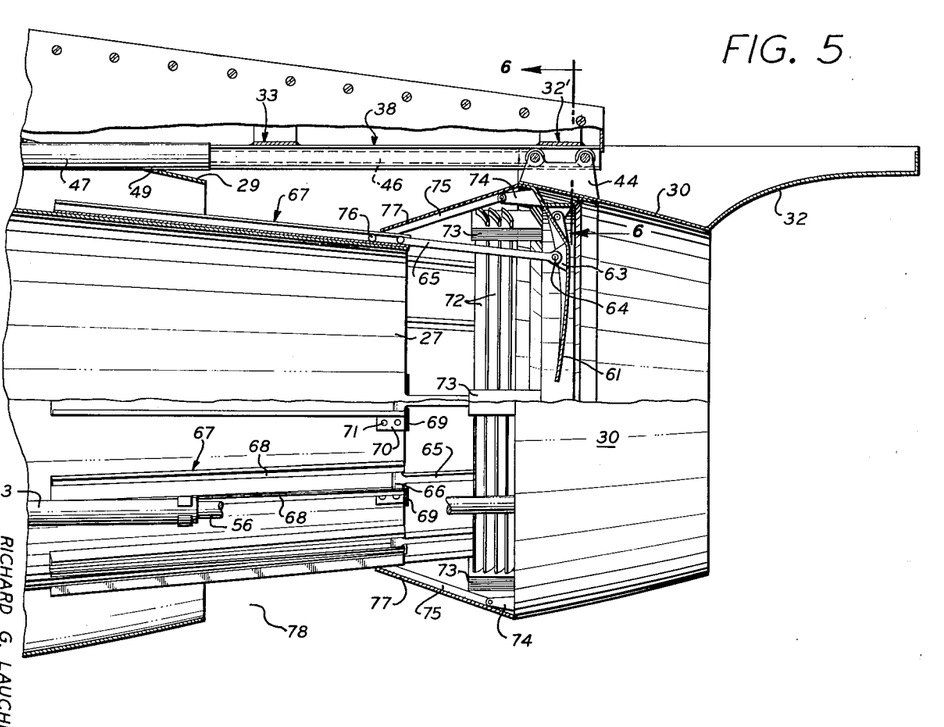
FIGURE 5 is a vertical section, partially in elevation, of the tail end of the engine as illustrated in FIGURE 2.
Figure 6:
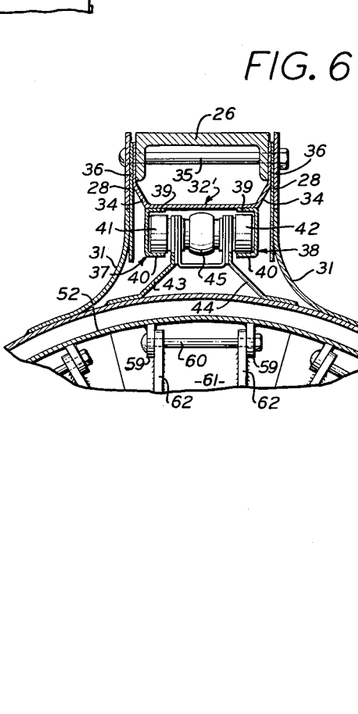
FIGURE 6 is a vertical section along line 6—6 of FIGURE 5 showing the mounting for the tail section.

In order to direct the flow of exhaust gas forwardly to produce reverse thrust, a plurality of spaced reversing vanes 72 are carried by a number of supports 73 attached to the forward facing surface of annular members 52. As illustrated in FIGURE 5, a number of reversing vanes pass through the supports and extend around a portion of the member 52 and a similar number of vanes extends around a portion of member 52 in the opposite side of the engine (see FIGURE 2). While three vanes are illustrated, the number of vanes can be varied for any particular installation.

The upper and lower portions of member 52 between the ends of the vanes 72 on opposite sides of the engine carry several brackets 74, each of which is pivotally connected to one end of a link 75. The other end of each link 75 has a cross pin 76 constructed similarly to cross pin 66 and also movable in the track of a channel member 67. Each link 75 carries a shelding segment 77 which is shaped to abut adjacent segments and form a continuous shield to block the flow of exhaust gas over the shielded area when the tail section 30 is extended. Thus, the shielding segments serve to protect certain portions of the engine, aircraft, and ground area from the exhaust gases, and reverse thrust is obtained from the reversing vanes which discharge to unshielded areas. It is understood that the area, as well as position, of the shield segments and reversing vanes can be varied to obtain reverse thrust while protecting the vital area around any given engine installation.

Figure 1:
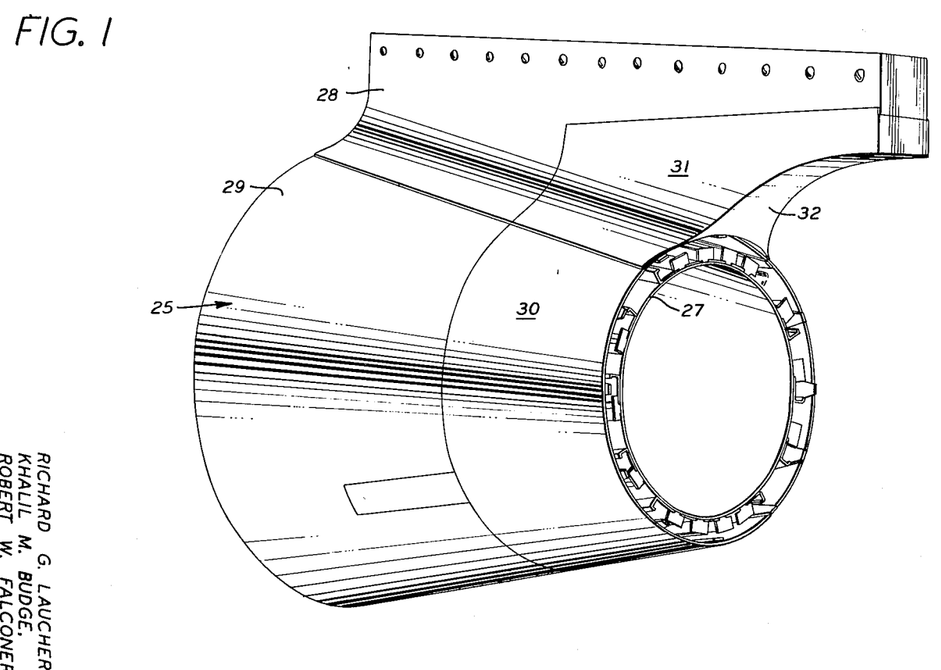
FIGURE 1 is a perspective view of the tail end of a turbojet engine showing the movable tail section in forward, non-reversing position.
Figure 2:
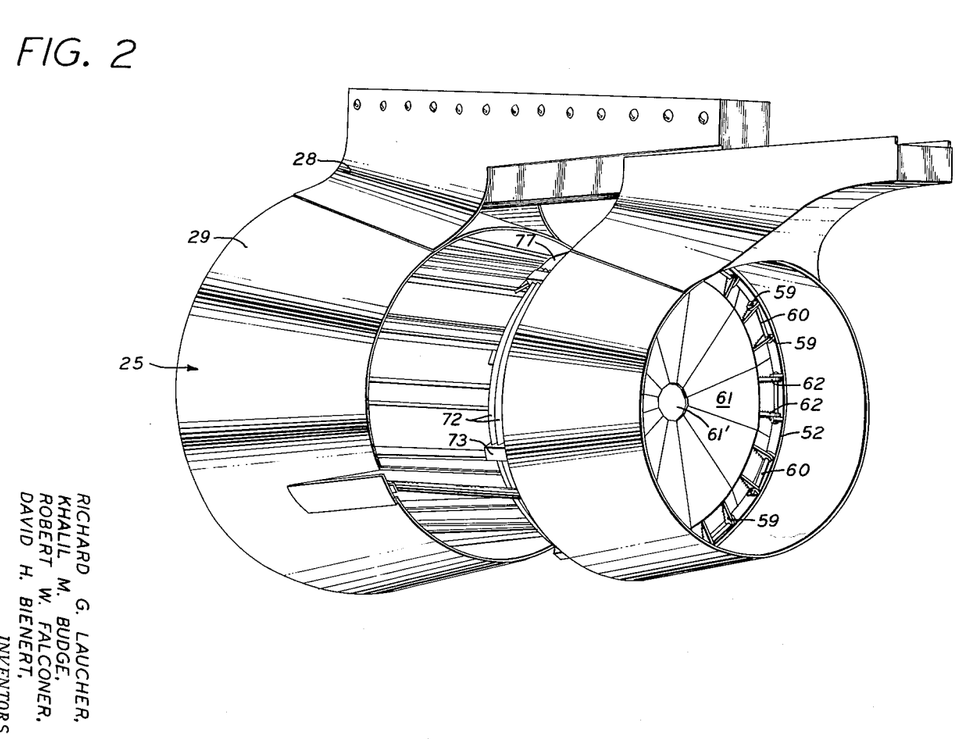
FIGURE 2 is a perspective view similar to FIGURE 1 showing the movable tail section in its rear, thrust reversing position with the blockage segments in position for maximum blockage.
Figure 3:
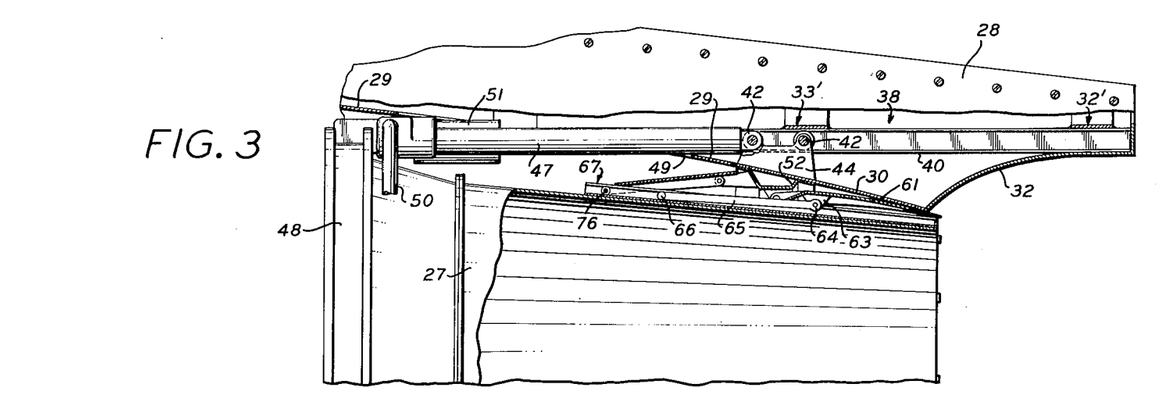
FIGURE 3 is a vertical section, partially in elevation, of the tail end of the engine as illustrated in FIGURE 1.
Figure 4:
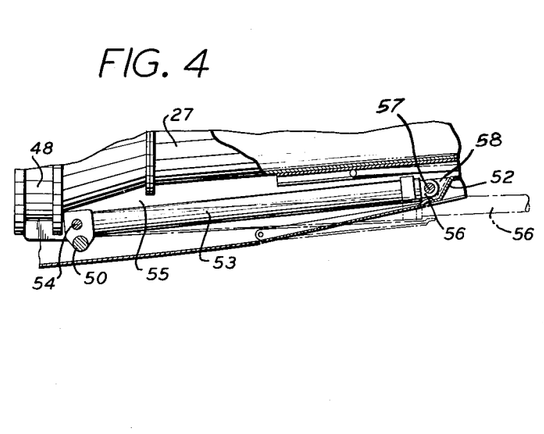
FIGURE 4 is a sectional view through the tail end of the engine as illustrated in FIGURE 1, showing the construction of one of the actuators for the movable tail section.

During normal operation of the engine, the actuators 47 and 53 retain the tail section 30 in the forward, stowed position with the tail section 30 abutting the nacelle 29 of engine 25 (see FIGS. 1 and 3). In this position, the blockage segments 61 extend along the exit nozzle and are stowed in the space between tail section 30 and the nozzle. Also, the links 65 for the blockage segments and the links 75 for the shield segments extend substantially along the engine, since cross pins 66 and 76 for these links are located at the forward portion of channel member 67. In FIGURE 3, the stowed position of the shielding segments is illustrated and it is understood that the reversing vanes 72 will occupy this same location over other portions of the circumference not in the shielding area. Thus, the blockage segments, shielding segments and reversing vanes are protected in stowed position out of the path of the hot exhaust gases and are not subject to high temperature during forward thrust operation.

When it is desired to obtain reverse thrust, the actuator 47 and 53 will move tail section 30 rearwardly on rollers 41 and 42. During the initial movement, the blockage segments will be exposed to engine exhaust and will be held outwardly against the tail section by the exhaust pressure until the cross pins 66 reach stops 69. Thus, the movement of tail section 30 will initially place an opening 78 around the exit nozzle forward of the end of the nozzle so that the opening will have no effect on engine performance.

After the forward end of tail section 30 passes the end of the exit nozzle and the cross pins 66 engage stops 69, further rearward movement of section 30 to the extended position will cause links 65 to move the blockage segments 61 downwardly about the pins 60 and against the exhaust pressure. In the fully extended position, determined by the stroke of the actuator, the segments 60 will abut each other to fully block the area of tail section 30 except for center opening 61'. It is apparent after cross pins 66 engage stops 69, the amount of blockage by segments 61 will progressively increase, since the segments will move downwardly and close together. Thus, the reverse thrust can be fully modulated from minimum to maximum in accordance with the position of tail section 30. With the blockage segments in intermediate positions, a portion of the exhaust gases can pass rearwardly past the segments.

With the segments 61 in blockage position, exhaust gases will be diverted through the opening between tail section 30 and the end of nozzle 27 and will pass through the reversing vanes 72 to produce a force component in the aft direction to retard the aircraft, and the more blockage by the segments, the more reverse thrust it develops. In the maximum blockage position (see FIGURES 2 and 5), maximum reverse thrust is developed. The forward thrust of any gases passing through opening 78 will be spoiled even though the gases do not pass through the reversing means. The area of the tail section blocked by segments 61 is larger than the area of the exit nozzle since the segments are pivoted around a circumference of the tail section which is larger than the circumference of the exit nozzle.

The shield segments 77 will continually shield exterior areas during aft movement of tail section 30 since the cross pins 76 will move along channel member 67 and segments 77 will continually extend between the exit nozzle and the aft end of the tail section. Since the tail section 30 is aft of the exit nozzle during blockage, and the blocked area is larger than the area of the exit nozzle, the engine feels the area of the exit nozzle during both normal and reversing operation so that no modification of engine controls is required for reverse thrust. Because the brackets 63 can be located by design at various positions on segment 61, the continual pressure force on segments 61 can be used such that, with failure of the actuators, the mechanism may be forcibly held in the blocking position or, by design change, the mechanism may move toward the forward thrust or non-reversing position. In other words, if brackets 63 are positioned inwardly from the center of gas pressure on the segments, the linkage would be fail safe in thrust reversing position, and if the center of gas pressure is inwardly from bracket 63, the linkage would be fail safe in the non-reversing position. Thus, this form of the invention has incorporated the advantages previously discussed.

When the tail section 30 is returned by the actuator to the non-reversing position, the segments 61 will first move outwardly about pins 60 and thereafter the cross pins 66 will slide forwardly in channel members 67. Also, cross pins 76 will continuously move forward. Thus, the block segments, shielding segments and reversing vanes can return to the stowed position of FIGURES 1 and 3. The symmetrical fore and aft movement of the reverser is insured because of the rigid support beam 26 and the synchronized actuators.

Figures 7, 8:
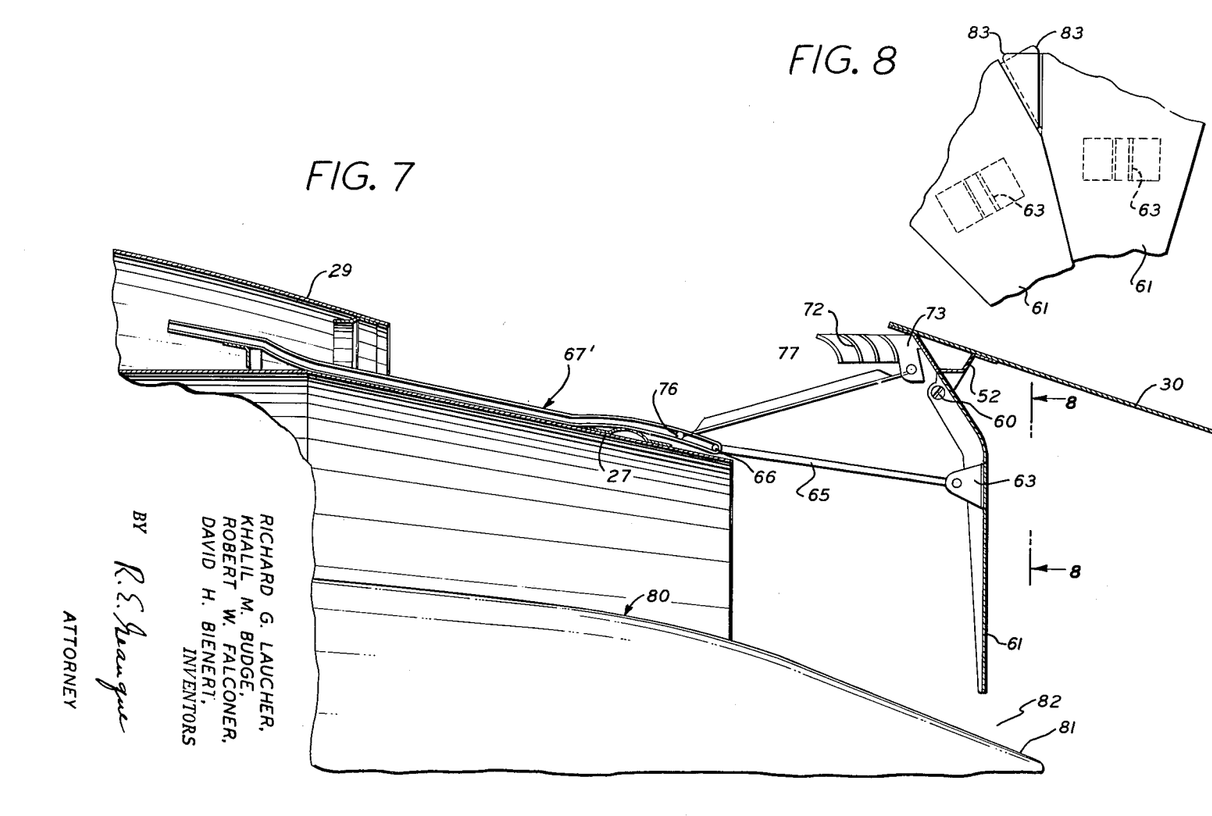
FIGURE 7 is a sectional view of a modified form of the thrust reverser of FIGURE 1 in which the blockage segments cooperate with a tail cone to block the aft end of the engine.
FIGURE 8 is a view along line 8—8 of FIGURE 7 showing the construction of the blockage segments.

A modification of this form of the invention for use with an engine having a tail cone is illustrated in FIGURE 7 wherein like reference numerals designate like parts. It is understood that the tail section 30 can be moved to its extended position by actuators 47 and 53 in the same manner as previously described. FIGURE 7 shows a section of the thrust reverser containing reverser vanes 72 and a shield segment 77 located beyond the vanes is also shown. Since the position of the pivot pins for connecting segments 77 to member 52 is changed slightly and since the exterior of the nozzle 27 is not smooth, the channel member 67' has a slightly different shape than member 67 previously described in order to follow the nozzle and permit stowage of the blockage segments, shielding segments and reversing vanes between tail section 30 and the exit nozzle. The tail cone 80 is located symmetrically within the exit nozzle and terminates beyond the nozzle at end 81. Blockage segments 61 are somewhat shorter for this modification so that when the tail section 30 is in its extended position and the segments are in position for maximum blockage, the inner ends of the segments are spaced from end 81 of the tail cone to form a concentric opening 82 around the end 81. Because of the shorter length of the segments, reverse thrust modulation can be accomplished without the segments interfering with the tail cone. Otherwise, the modification of FIGURE 7 has all the advantages and functions in the same manner as the form previously described.

Referring to FIGURE 8, the blockage segments 61 are shown in maximum blockage position. The edges of each segment can be provided with a synchronizing tab 83 located between the brackets 63 and the pivot pin 60. The tabs on adjacent flaps overlap one another to permit relative movement between the edges of the segments into blockage and non-blockage positions. Since the tab on one edge of a segment is to the rear of the tab on an adjacent segment and the tab on the other edge of the segment is forward of the tab on an adjacent segment, the tabs 83 serve to interlock all of the segments and synchronize the movement of the segments so that they move inwardly and outwardly together.

A second form of the invention for use with a variable area exit nozzle is illustrated in FIGURES 9-15. Variable area exit nozzle 85 is comprised of a plurality of segments 86 having overlapping edges 87, FIG. 12, which permit relative movement of the segments to vary the area of the nozzle without developing openings between the segments. Each segment is supported by an outwardly extending web 88 which has a small notched end 89 pivotally supported by a bracket 90 extending around engine passage 91 just forward of the variable nozzle 85. The outer edge of each web contains a cam slot 92 through which passes a ring 93 supported by brackets 94 located on opposite sides of each web 88. The brackets 94 are secured to an annular member 95 which surrounds the nozzle 85 and which is movable axially along the nozzle by a plurality actuator shaft 96. The actuators 97 for shafts 96 can be mounted in brackets 97' attached to passage 91 and can be controlled by any suitable control mechanism. Because of the shape of slots 92, rearward movement of member 95 will cause the nozzle segments to move outwardly until the ring 93 engages the rear ends of the slots and forward movement of member 95 will cause the nozzle segments to move inwardly to reduce the nozzle area (see FIGURE 9). As will appear, operation of the variable exit nozzle 85 can be entirely independent of the thrust reverser operation. It is understood that other support means, such as rollers and tracks, can be provided for member 95 in addition to the actuator shafts.

The nacelle or cover 98 for the engine has a rear, conical section 99 which extends beyond the aft end of nozzle 85 and the end of section 99 supports a plurality of brackets 100 which project inwardly. A movable tail section 101 surrounds the conical section 99 and extends aft thereof to form an ejector or air pump. The forward edge of section 101 abuts the nacelle 98 so that the nacelle and tail section form a streamline surface of minimum drag. An annular member 102 provides a support surface and a lip 103 (see FIGURE 11) for directing the exhaust gases rearwardly in a manner to be described. A plurality of trapezoidal shaped blockage segments 104 are each pivotally connected at one end by a pin 105 to a bracket 106. These brackets are secured to member 102 and are spaced around the circumference of member 102 so that the large end of the segments are adjacent to each other. Each segment has a center web 107 projecting inwardly and containing a cam slot 108, and each slot slidably receives a pin 109 carried at one end of a link 110. The other end of each link 110 is pivotally connected to a bracket 100 by a pin 111. In the forward stowed position of tail section 101, the forward portion of each blockage segment 104 is located in the space between section 99 and the tail section 101 and the rear portion of each segment and the links 110 extend beyond the aft end of section 99.

Four brackets 112 are equally spaced around member 102 and are each connected to one end of an actuator shaft 113 by a pin 114. The actuator 115 for each shaft is supported at its aft end by an annular channel member 116 and at its forward end by an annular channel member 117, FIG. 14. The member 116 is reinforced at the location of each actuator by stiffeners 118, FIGS. 10 and 13, located on opposite sides of an opening 119 in section 99 through which the shaft 113 projects. Each of the four actuators can consist of suitable power units, such as hydraulic or pneumatic cylinders or motors. It is pointed out that a continuous passage exists from the end of the nozzle through space 120 between the section 99 and member 95, space 121 between member 116 and member 95, and space 122 between member 117 and passage 91.

Figure 13:
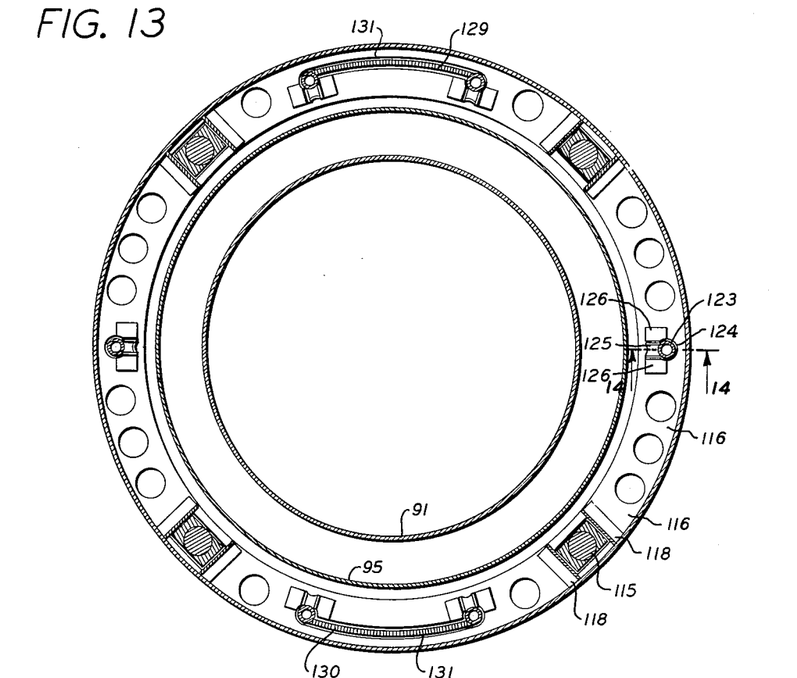
FIGURE 13 is a sectional view along line 13—13 of FIGURE 11 illustrating the actuator and support rods for the movable tail section and shielded areas.
Figure 14:
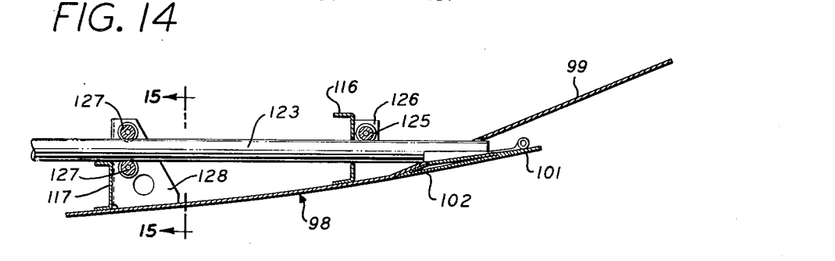
FIGURE 14 is a sectional view along line 14—14 of FIGURE 13 showing the roller supports for the support rods.
Figure 15:
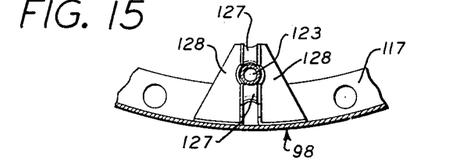
FIGURE 15 is a sectional view along line 15—15 of FIGURE 14.

The tail section 101 is supported for movement by a plurality of support rods 123 (see FIGS. 11 and 14), each of which has one end secured to the annular member 102. Each rod extends through an opening 124 in channel member 116, FIG. 13, and a roller 125 is secured to member 116 by brackets 126 in order to guide and support the rod. Each rod also extends adjacent the inner surface of channel member 117, FIGS. 13 and 14, and is supported on opposite sides by rollers 127. A pair of brackets 128 on opposite sides of rod 123 supports the rollers and the brackets are secured to member 117 and nacelle 98. As illustrated in FIGURE 13, six rods 123 are utilized to support tail section 101 and the rods are of sufficient length to remain between rollers 127 when tail section 101 is extended by actuators 115. Shielding plates 129 and 130, reinforced by a honeycomb structure, are secured between the two upper and the two lower rods of FIGURE 13, respectively, and each plate extends through a slot 131 in channel member 116 and through a slot in member 99. The length of the plates 129 and 130 is sufficient to shield an exterior area above and below the engine since the plates bridge the space between tail section 101 and section 99 when the tail section is extended (see FIGURE 11). It is apparent that the plates 129 and 130 can be varied in size and located at any position around the engine in order to shield any predetermined exterior areas.

Figures 9, 10:
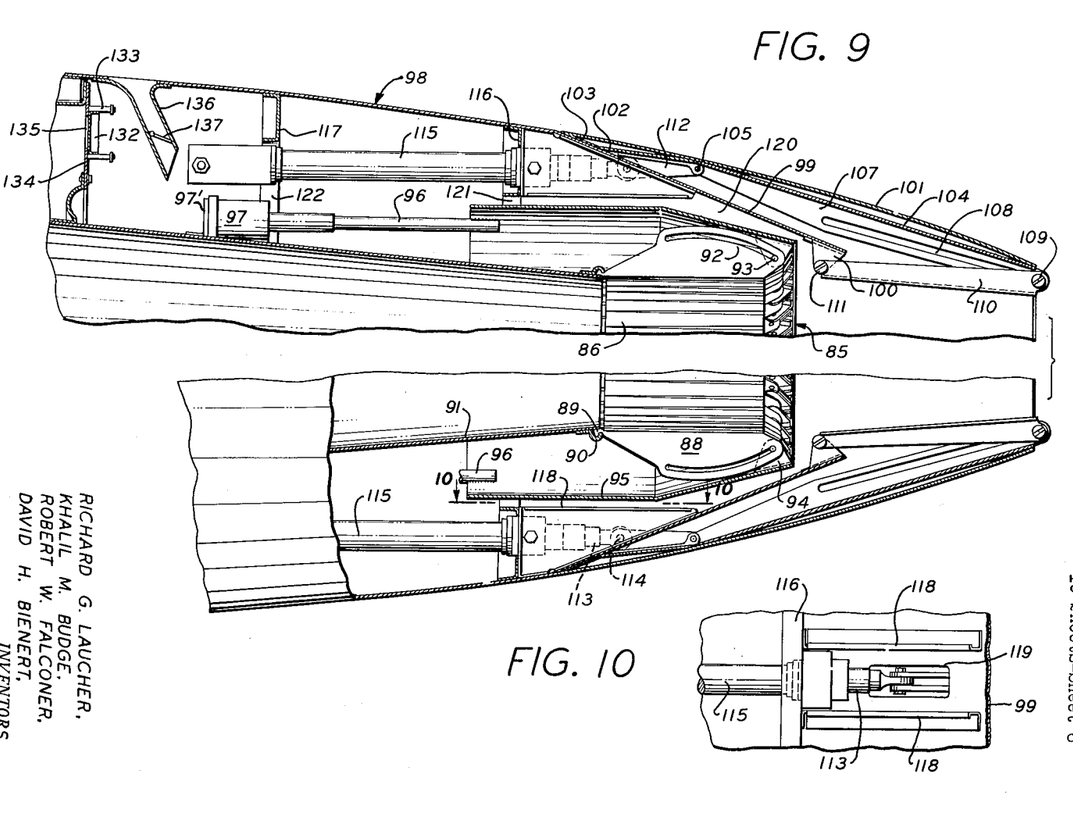
FIGURE 9 is a sectional view of a second form of thrust reverser in which the movable tail section surrounds a variable area exit nozzle.
FIGURE 10 is a view along line 10—10 of FIGURE 9 showing the connection of an actuator to the movable tail section.
Figures 11, 12:
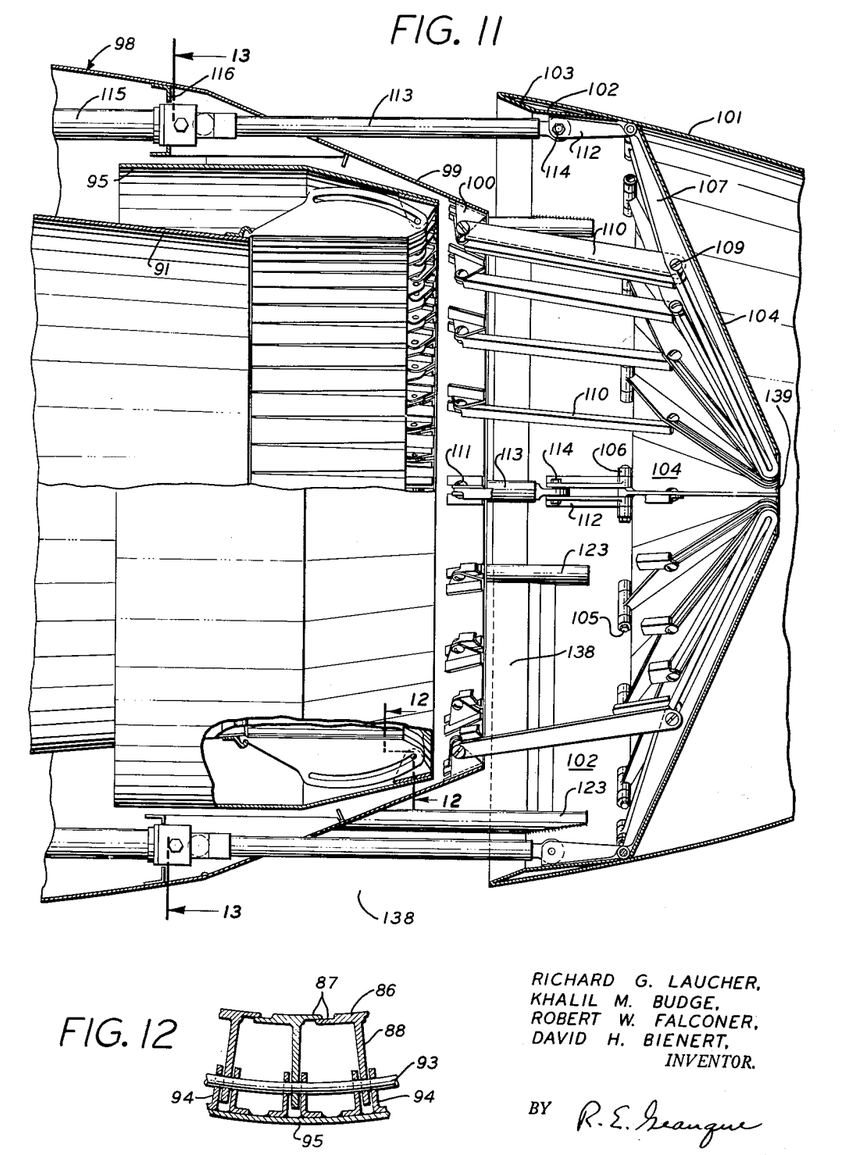
FIGURE 11 is a sectional view similar to FIGURE 9 showing the tail section and blockage segments in position for thrust reversal.
FIGURE 12 is a sectional view along line 12—12 of FIGURE 11 showing the elements of the variable area nozzle.

When the tail section 101 is in the stowed position of FIGURE 9 with the pins 109 at the aft end of slots 108, the tail section projects beyond the end of the exit nozzle and the fixed section 99 prevents the blockage segments from falling inward. Also, the tail section 101 prevents the segments from moving outwardly. Thus the tail section 101 and the segments serve as a secondary ejector wall for drawing cooling air through the passage defined by spaces 120, 121 and 122. Air is drawn into the passage through a check valve 132 slidably mounted by pins 133 attached to a bulkhead 134 around an opening 135 in the bulkhead. Also, atmospheric cooling air is introduced to the passage through conduit 136 containing a check valve 137. With the tail section in stowed position, cooling air will be drawn through opening 135 from the forward afterburner portion of the engine and will also be drawn from atmosphere through conduit 136 since a suction force is created to hold valves 132 and 137 open. Also, when the segments are moved to blockage position, the check valves 132 and 137 will close to prevent reverse flow of the exhaust gases through the passages controlled by the valves.

Upon operation of the actuators 115, the tail section 101 will move aft to produce opening 138 aft of the engine. Since the exhaust pressure is acting upon the blockage segments 104, the pins 109 will slide in slot 108 until the forward end of the slots are reached. Thereafter, continued aft movement of the tail section will cause link 110 to pull the blockage segments inward to block the space aft of the exit nozzle. When the tail section reaches its fully extended position, the segments will be adjacent each other to completely block the exhaust except for a center opening 139 defined by the inner ends of the segments (see FIGURE 11). Thus, the full modulation of reverse thrust is available between the position of the tail section at which the segments start to move inwardly and the fully extended position of the tail section at which maximum blockage is obtained. A forward component of flow is imparted to the exhaust gases forced through opening 138 by the blockage segments because of the forward direction of the passage located between rear section 99 and member 102. Since the blockage segments continually receive exhaust pressure, the linkage for the segments can be fail safe in the non-reversing position or reversing position by properly selecting the location of the forward end of slots 108 on the segments.

Figures 16, 17, 18:
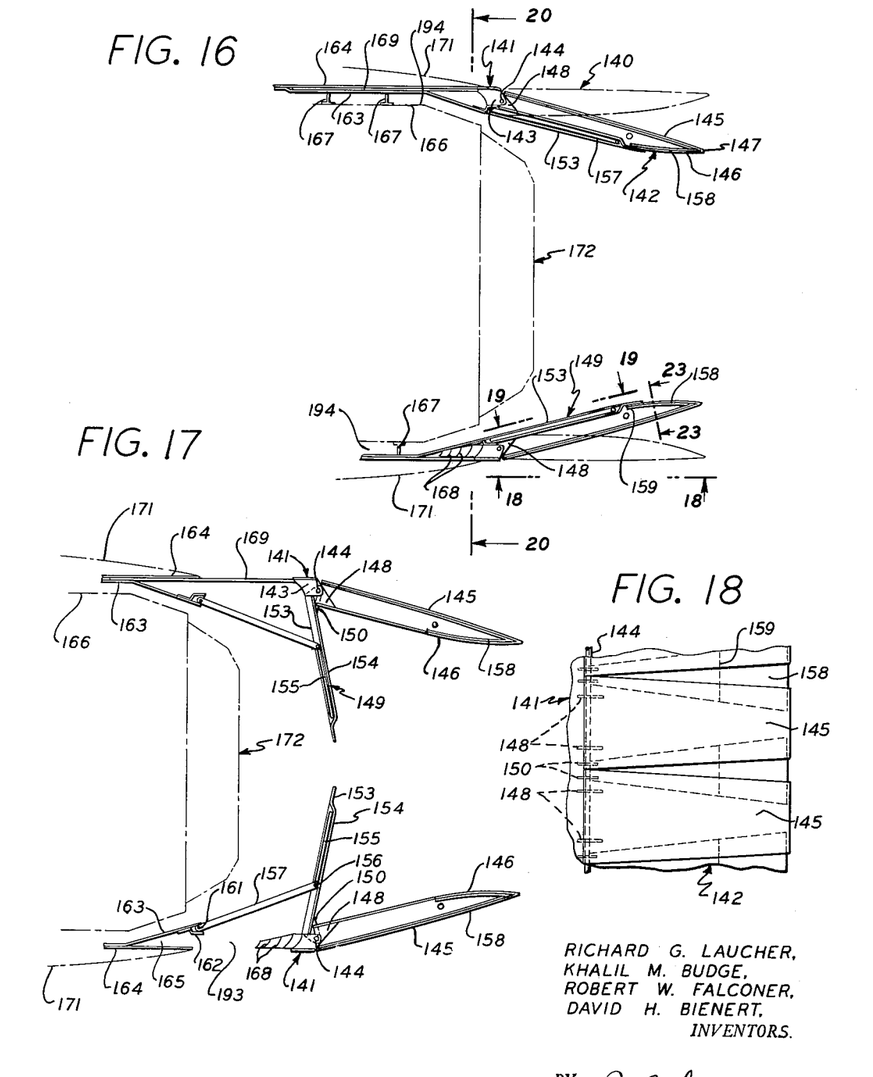
FIGURE 16 is a sectional view along line 16—16 of FIGURE 20 of a third form of thrust reverser in which the movable tail section supports the blockage segments and elements of a variable area, secondary ejector nozzle.
FIGURE 17 is a sectional view along a different diameter than FIGURE 16 showing the blockage segments in maximum blockage position.
FIGURE 18 is an extended plan view along line 18—18 of FIGURE 16 showing the exterior of the ejector nozzle elements and sealing segments when the ejector nozzle is in open position.

Another form of the invention for use with a variable ejector nozzle is illustrated in FIGURES 16-23. Referring to FIGURE 16, a movable tail end section 140 comprises a rigid support member 141 and a plurality of ejector elements 142. A number of brackets 143 are fixed to support member 141 and carry a circular ring 144 for pivotally supporting the element 142. Each element 142 has an outer surface 145 and an inner surface 146 and these surfaces join at aft end 147. The forward end of each element is open and contains a pair of brackets 148 secured to surface 146. Ring 144 passes through the brackets 148 to provide the pivotal connection between elements 142 and member 141. A plurality of blockage segments 149 are also pivotally connected to ring 144 and extend along the interior surface of ejector elements 142 when tail section 140 is in its stowed position as illustrated in FIGURE 16. Each segment has a pair of brackets 150, FIGS. 18 and 19, which are offset from brackets 148 and which receive ring 144.

Figure 19:
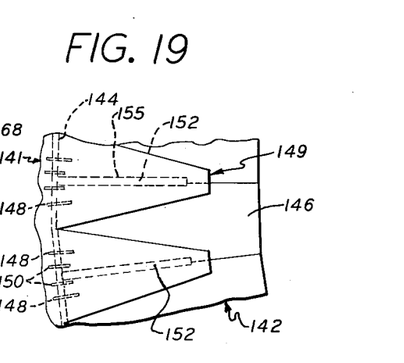
FIGURE 19 is an extended plan view along line 19—19 of FIGURE 16 showing the exterior of the ejector nozzle elements and blockage segments when the ejector nozzle is in closed position.

As shown in FIGURE 19, both the ejector elements 142 and blockage segments 149 are trapezoidal in shape and the elements 142 extend aft of the segments 149. The adjacent edges of inner surface 146 of the ejector elements are cut back along line 151 to provide an opening 152 into each element at each edge and when the elements are in closed position as illustrated in FIGURE 19, the openings combine to form a larger opening for the linkage of the blockage segements. Each blockage segment is comprised of a surface 153 which has a raised portion 154, FIG. 17, along the center line of the segments. Each side of portion 154 contains a groove 155 and the two grooves are speced apart to slidably support pin 156 and receive the end of a link 157 carrying pin 156. The blockage segments are offset with respect to the ejector elements so that the portion 154 of each segment is received within the openings 152 at the edge of adjacent ejector elements 142 when the blockage segments are in their outward, non-blocking position (see FIGURE 16). Thus the surface of the blockage segments can be positioned flat against the inner surface of the ejector elements in order to provide a seal across the adjacent edges of the elements over the length of the segments (see FIGURES 16 and 19).

Also, the adjacent edges of each pair of ejector elements is covered by a sealing member 158 which extends into the interior of each element of the pair and covers the adjacent edges over the entire length of the outer surface 149 and over the length of the inner surface 146 from the edge 159 to the aft end 147 (see FIGURES 16 and 18). Since the edge 159 is located below the blockage segment covering the edges of a pair of elements, each sealing member 158 seals the length of adjacent element edges which are not sealed by the blockage segments. Each of the sealing members 158 is pivotally connected to ring 144 by brackets 160. Thus, the ejector nozzle elements can move from closed position (illustrated by FIGURE 19 and the full line position of FIGURE 16) to the open position (illustrated in FIGURE 18 and the dotted line position of FIGURE 16) without an opening being formed between the edges of the ejector nozzle elements. Since ejector elements 142, block segments 149 and sealing member 158 are all pivotally connected to ring 144, these components can all move together as the area of the secondary ejector nozzle is varied.

Figure 20:
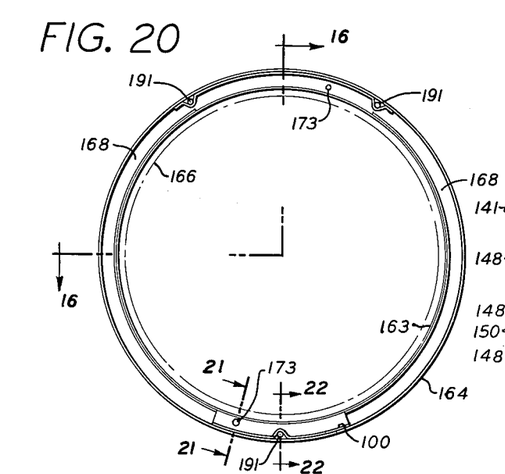
FIGURE 20 is a transverse vertical section along line 20—20 of FIGURE 16 showing the location of the shielding plate for shielding external areas.
Figure 21:
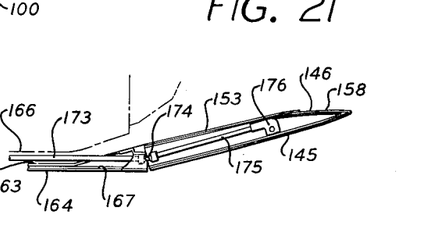
FIGURE 21 is a sectional view along line 21—21 of FIGURE 20 showing the power drive for moving the elements of the ejector nozzle.
Figure 22:
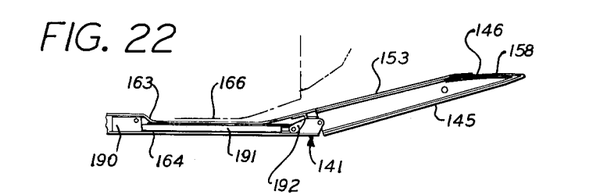
FIGURE 22 is a sectional view along line 22—22 of FIGURE 20 illustrating the actuators for moving the tail section into thrust reversing position.
Figure 23:
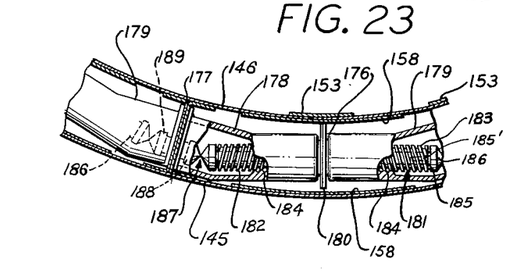
FIGURE 23 is a sectional view along line 23—23 of FIGURE 16 showing the mechanism for moving the elements of the variable area secondary ejector nozzle.

The other ends of each link 157 are pivotally connected to a fixed ring 161 carried by brackets 162, secured to the conical aft end of an annular support 163. A second annular support 164 is attached to support 163 and extends rearwardly to form, with said conical end of support 163, an annular space 165. The supports 163 and 164 can be secured around engine 166 by suitable means, such as by bracket 167 connected with the engine. A plurality of spaced reversing vanes 168 are attached to support member 141 over two sections of its circumference and extend forwardly of member 141 into the space 165 when tail section 140 is in stowed position. Referring to FIGURE 20, the reversing vanes 168 are located on sections of member 141 on opposite sides of the vertical center line. The upper section of member 141 is connected with a shielding plate 169, FIGS. 16 and 17, which extends forwardly and is slidable in a space formed by separation of supports 163 and 164. Also, the lower section of member 141 is connected with shielding plate 170 which extends forwardly into a similar space between supports 163 and 164 (see FIGURE 21). The plates 169 and 170 serve to interrupt the flow of exhaust gas during thrust reversal to protect selected external areas of the aircraft from the hot exhaust gases and further serves to support the tail section 140 during its movement.

In the stowed position of the tail section 140 illustrated in FIGURE 16, the rear end of engine nacelle 171 terminates adjacent to support member 141 so that the nacelle and the tail section form a streamlined surface of minimum drag. Also, the support member 141 surrounds the variable area exit nozzle 172, which can be of any suitable construction, such as a plurality of segments having suitable sealing means. A pair of actuator drive shafts 173 (see FIGURES 20 and 21) are provided to vary the area of the secondary ejector nozzle, formed of elements 142, by moving the elements between the full line and the dotted line positions of FIGURE 16. The shafts 173 extend through an opening in the conical end of support 163 and are rotated by any suitable power unit (not shown). Each shaft is connected by a universal coupling 174 to a second shaft 175, extending through one of said elements and connecting with a worm gear drive 176. Each of the ejector elements has a center partition 177 extending between surfaces 145 and 146 and each partition supports a housing 178 on one side and a housing 179 on the other side. Each housing 178 is adjacent to a housing 179 at flanges 180 and a shaft 181 extends through both housings. Portions of shaft 181 in housing 179 and 178 have oppositely directed threads 182 and 183 respectively, which coact with threads 184 carried by both the housings. Thus, rotation of the shaft 181 in one direction will cause the housings 178 and 179 to move apart to enlarge the area of the ejector nozzle and rotation in the opposite direction will cause housings to move toward one another to reduce the area of the ejector nozzle. Each end of shaft 181 has an opening to receive a shaft 185 which carries one element 186 of a universal coupling 187 (shown diagrammatically). The shaft 185 has a key 185' coacting with shaft 181 to cause shaft 185 to rotate with shaft 181 while permitting shaft 185 to move axially of shaft 181. The other element 188 of the universal coupling is connected to a stub shaft 189 which is rotatively mounted in partition 177. A second element 188 is also connected to stub shaft 189 and serves to transmit the rotation of the stub shaft to an element 186 on the opposite side of the partition. Thus, the rotation of two shafts 181 by the two drives 176 is transmitted to the remainder of the shafts 181 through the universal couplings 187 and stub shafts 189 and the shafts 185 can extend relatively to shafts 181 to permit movement of the elements 142 to change the area of the secondary ejector nozzle. It is apparent that the means for varying the area of the ejector nozzle has a drawstring action.

Three actuators 190 (see FIGURE 22) are located around the engine in spaces formed by separation of supports 163 and 164. Each actuator 190 moves a shaft 191 (see FIGURE 20) which is connected to support member 141 by a bracket 192. The actuators can be of any suitable type and can be synchronized for movement of shafts 191 together in order to move the tail section 140 between its stowed position of FIGURE 16 and its extended position illustrated in FIGURE 17. In all positions, the tail section will be supported by the shielding plates 169 and 170.

In the stowed position, the links 157 will be positioned within portion 154 of the blockage segments (see FIGURE 16) with pins 156 at the aft ends of groove 155. As the tail section is moved rearwardly, the pins 156 will first slide in the grooves since the blockage segments will be held outwardly by the pressure of the exhaust gas. When pins 156 reach the forward end of the groove, the links 157 will commence to pull the blockage segments 149 inwardly to block the area of the tail section. At the end of the stroke of the actuators, the segments will be in the maximum blockage position illustrated in FIGURE 17. It is apparent that full modulation of the blockage, between maximum and minimum, can be obtained in accordance with the aft position of the tail section 140 and that the segments will move aft of the exit nozzle before blockage commences. Since the circumference of member 141 around which the blockage segments are pivoted is larger than the end of the exit nozzle, the area of blockage is larger than the end of the exit nozzle, so that the engine continues to feel the area of the exit nozzle and standard engine controls can be utilized during both normal and thrust reversing operation. Also, the aft end of the grooves 155 in the blockage segments can be located to either side of the center of gas pressure on the segments to make the segments fail safe in either the reversing or non-reversing position.

As the tail section moves rearwardly, an opening 193 is formed between the rear end of nacelle 171 and the tail section and the exhaust gases blocked by segments 149 will be forced through this opening. Since the reversing vanes 168 are located within the opening, a forward component will be imparted to the exhaust gases to produce reverse thrust. It is understood that surfaces could be provided ahead of opening 193 to direct the exhaust gases forward without the use of reversing vanes. Also, since the plates 169 and 170 move rearwardly with the tail section, the plates will continually cover portions of opening 193 to shield selected exterior areas from the hot exhaust gas.

An air channel 194 is provided between engine 166 and support 163 to permit the passage of cooling air around the engine. The cooling air can be drawn from forward portions surrounding the engine and from atmosphere by the secondary ejector nozzle when the tail section is in its stowed position. The cooling air, drawn into the exhaust, serves to increase the mass flow and adds thrust. Since the ejector nozzle forms a variable conical and also a variable convergent-divergent nozzle with the primary exit nozzle and provides a closed duct of larger diameter than the primary nozzle, considerable thrust improvement results from the expansion of gases within the area of the ejector nozzle. It is apparent that the area of the ejector nozzle can be varied independently of the area of the primary exit nozzle and can be scheduled in accordance with the area of the primary exit nozzle and the pressure ratio across the primary exit nozzle.

Figure 24:
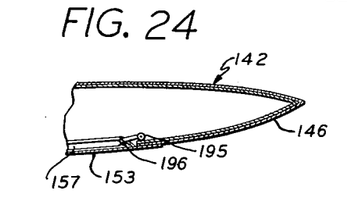
FIGURE 24 is an enlarged partial view of a blockage segment showing modified linkage to lock the segments in open position to the ejector elements.

A modification of the segment linkage is shown in FIGURE 24 wherein the portion 154 of each segment 149 is slotted along its length to receive a roller 195, supported on an arm attached to the end of link 157. The slot 196 extends to the aft end of portion 154 to permit the roller to move through the slot and engage the surface 146 and seal 158 in order to lock the segments in open position, as the link 157 reaches its outermost position.

In all of the embodiments of the invention, the blockage segments are pivoted around a circumference of the tail section which is larger than the circumference of the end of the exit nozzle and thus, the area of blockage is larger than the area at the end of the nozzle. Also, because of the movable pin in the linkage for moving the blockage segments, the circumference of the tail section at which the segments are pivotally supported is permitted to move beyond the aft end of the exit nozzle before the linkage starts the inward movement of the segments. Thus, blockage occurs at a distance behind the end of the exit nozzle so that normal or afterburner performance of the engine is not effected by the blockage and no modification of engine controls is required. Also, positive reverse thrust can be obtained at any engine operating point. In each embodiment of the invention, the tail section forms a continuous cover around the blockage segments so that seals are not required between the blockage segments. During inward movement of the blockage segments, spaces exist between the segments which reduces the blocked area during initial movement. At the end of the inward movement of the segments, these spaces are reduced. Thus, the area blocked varies substantially linearly with the postion of the tail section rather than having maximum rate of blockage occur on initial movement which would be the case where seals are located between the segments. Therefore, scheduling of the blocked area with movement of the tail section is much more convenient when the space between the segments is unsealed. Also, by utilizing segments without seals therebetween, the loads on the segments are reduced during initial inward movement since passages exist between the segments, and maximum load on the linkages for the segments does not occur until the segments have moved a considerable distance inwardly.

Since the components of the thrust reverser in all forms of the invention are not subject to afterburner temperature, no special cooling means for the components are required. It is understood that various modifications can be made in the linkage means for moving the segments and in the supports and actuator for the tail section. For instance, the support rods 123 shown in FIGURE 11 could replace the support beam 26 shown in FIGURE 6 as a support means for the tail section. Generally, any suitable linkage means can be utilized to move the blockage segments inwardly and the tail section and linkage means can be supported by the air frame entirely independent of the engine and nacelle structure. Such independent support would provide a stationary member for one end of the linkage means and would have a carriage means and actuator means for the tail section. Also, since one end of the linkage for the blockage segment is secured either to the engine structure or airframe structure, the loads on the segments are transmitted to such structure. The number of blockage segments, nozzle segments and actuators can be changed for any particular installation without altering the basic operation. The exit nozzles or areas described by circumferences and diameters may be other than circular as may be the turning vanes, outer nacelle, etc. Because of the manner in which the blockage segments extend along the tail section when in stowed position, the section can be shaped to provide a streamlined end portion for jet engines of various configurations. Various other modifications are contemplated by those skilled in the art without departing from the spirit and scope of the invention as hereinafter defined by the appended claims.

What is claimed is:

1. A thrust reverser for a jet engine having a streamlined cover and an exit nozzle, comprising a tubular tail section positioned at the aft end of said engine, means for moving said tail section axially between a forward stowed position and a rear extended position, said tail section being located around the exit nozzle of said engine and adjacent to said cover when in the stowed position and being located aft of said exit nozzle to provide a passageway for exhaust gas between said tail section and said exit nozzle when in the extended position, a plurality of blockage segments, means pivotally supporting said blockage segments on and around the interior surface of said tail section and in positions extending along the inner surface of said tail section when said tail section is in stowed position, and linkage means connecting said segments to a stationary member associated with said engine for moving said segments during a portion of the movement of said tail section, said linkage means having a movable connection for permitting said tail section to move rearwardly so as to open said passageway before said linkage means commences to move said blockage segments inwardly upon further rearward movement of said tail section to block the transverse area of said tail section and direct exhaust gas through said passageway.

2. A thrust reverser as defined in claim 1 having a rear section on said cover extending interiorly of said tail section when said tail section is in its stowed position with the forward end of said tail section being shaped to abut the outer surface of said rear section, said rear section and said forward end of said tail section defining the shape of said passageway and imparting to said exhaust gases a flow component in the forward direction when said tail section is in its extended position.

3. A thrust reverser as defined in claim 1 wherein said blockage segments have a large end pivotally connected to said tail section and a smaller end movable inwardly providing variable open spaces between blockage segments in all but the final blockage position, the edges of said segments moving closer together as said segments are pivoted inwardly by said linkage means to provide for modulation of the area blocked by said segments as said tail section moves rearwardly.

4. A thrust reverser as defined in claim 3 having a tail cone located within said exit nozzle and extending rearwardly thereof, said blockage segments having a length to block the space between said tail section and said tail cone without engaging said tail cone when in maximum inward position to obtain maximum blockage.

5. A thrust reverser as defined in claim 1 wherein said exit nozzle comprises a plurality of nozzle segments pivotally connected to the end of said engine, said nozzle segments having overlapping edges providing for maintaining closed the peripheral surface formed by said nozzle segments when pivoted inwardly and outwardly, and axially movable actuator means connected with said nozzle segments to move said segments to vary the area of the exit nozzle.

6. A thrust reverser as defined in claim 1 wherein said means pivotally supporting said blockage segments on said tail section are arranged around a circumference of larger diameter than the end of said exit nozzle.

7. A thrust reverser as defined in claim 1 wherein said tail section comprises a plurality of pivotally supported elements forming a secondary ejector nozzle extending aft of said exit nozzle when said tail section is in stowed position, and actuator means for moving said elements to vary the area of said secondary ejector nozzle.

8. A thrust reverser for a jet engine having an exit nozzle comprising a nacelle surrounding said engine, a streamlined tail section located at the aft end of said engine, means for moving said tail section along the axial line of said engine between a forward stowed position and a rear extended position, said tail section being located exteriorly around said exit nozzle and adjacent to said nacelle when in stowed position and being located aft of said exit nozzle to provide a passageway for exhaust gas between said tail section and said exit nozzle when in extended position, a plurality of blockage segments pivotally connected at their forward ends on and around an interior circumference of said tail section for movement into the interior of said tail section to block the area of said tail section, and linkage means for moving said blockage segments during movement of said tail section, said linkage means comprising a link for each segment connected at one end to a fixed pivot point on the interior of said segment spaced from the pivoted end of the segment, the other end of each link being connected to a movable pivot pin, stationary guide means on said engine for each movable pivot pin, and a stop at the aft end of each guide means for stopping said movable pivot pin, said moving means initially moving said tail section rearwardly to open said passageway for exhaust gas between said tail section and said exit nozzle and initially moving each movable pivot pin toward said stop, each blockage segment upon continued rearward movement of said tail section being pivoted inwardly by one of said links after engagement of the movable pivot pin for the link with its stop in order to block the tail section and direct exhaust gas through said passageway to obtain reverse thrust.

9. A thrust reverser as defined in claim 8 wherein said tail section is located forward of the end of said exit nozzle when in stowed position, said tail section being larger than said exit nozzle to provide an annular space between said nozzle and said tail section when in its stowed position, said blockage segments being stowed within said space and extending along the interior surface of said tail section and being held in the extending position by the exhaust pressure until the movable pivot pins of said links engage said stops during rearward movement of said tail section.

10. A thrust reverser as defined in claim 8 having reversing vanes secured to and extending around the forward end of said tail section to receive and direct forward the exhaust gas forced through said passageway by said blockage segments.

11. A thrust reverser for a jet engine having an exit nozzle, a nacelle surrounding said engine and having an inwardly tapered rear section, a tail section located at the aft end of said engine, means for moving said tail section along the axial line of said engine between a forward stowed position and a rear extended position, said tail section being located around said exit nozzle and said rear section and extending beyond the end of said nozzle when in stowed position, the forward end of said tail section abutting said nacelle at the forward end of said rear section when in stowed position, said tail section in the extended position being located aft of said exit nozzle to provide a passageway for exhaust gas between said tail section and the rear section of said exit nozzle, a plurality of blockage segments pivotally connected at their forward ends on and around an interior circumference of said tail section for movement into the interior of said tail section to block the area of said tail section, and linkage means for moving said blockage segments during movement of said tail section, said linkage means comprising a link for each segment pivotally connected at one end to the aft end of said rear section, each of said segments having a web containing a slot, the other end of each link being connected to a pin movable in one of said slots, said moving means initially moving said tail section to open said passageway and initially moving said movable pins toward the forward ends of said segment slots, each blockage segment being pivoted inwardly by one of said links after engagement of said movable pins with the forward ends of said slots in order to block the tail section and direct exhaust gas through said passageway to obtain reverse thrust.

12. A thrust reverser as defined in claim 11 having a plurality of support rods connected with said tail section and spaced around said engine, and means for movably connecting said rods to said engine ot permit said rods to extend rearwardly with said tail section to support said tail section.

13. A thrust reverser as defined in claim 11 wherein said rear section is larger in diameter than said exit nozzle to define an air supply pasasgeway connecting with the space between said engine and said nacelle, the portion of said tail section extending beyond the end of said nozzle providing a secondary ejector for pumping air from said space.

14. A thrust reverser for a jet engine having an exit nozzle comprising a nacelle surrounding said engine, a streamlined tail section located at the aft end of said engine, means for moving said tail section along the axial line of said engine between a forward stowed position and a rear extended position, said tail section being located around said exit nozzle and adjacent to said nacelle when in stowed position and being located aft of said exit nozzle to provide a passageway for exhaust gas between said tail section and said exit nozzle when in extended position, said tail section comprising a support member and a plurality of elements pivotally supported at their forward ends by said support member to form a variable area secondary ejector nozzle, drive means for moving said elements inwardly and outwardly to vary the area of said ejector nozzle, a plurality of blockage segments pivotally connected at one end to said support member for movement into the interior of said tail section to block the transverse area of said tail section, and extensible linkage means for moving said blockage segments to permit initial rearward movement of said tail section so as to open said passageway prior to movement of said segments inwardly and actuated by further rearward movement of said tail section to draw said segments inwardly so as to modulate and block the transverse area of said tail section, and said blockage segments being constructed and arranged in overlapping relation with the downstream edges of said ejector elements and extending along said elements when said tail section is in its stowed position thereby providing a seal between said downstream edges for all stowed positions of said blockage segments and also to such extended position of said tail section until said blockage segments are moved to modulate and block the transverse area of said tail section.

15. A thrust reverser as defined in claim 14 wherein said linkage means for said segments comprises a link for each segment pivotally connected at one end to a stationary support adjacent said exit nozzle, the other end of each link having a pin located in a slot within one of said segments, said segments continually receiving the pressure of the exhaust gases to cause said pin to move in said slot prior to moving said segments inwardly during movement of said tail section towards its extended position.

16. A thrust reverser as defined in claim 14 having sealing means extending between the edges of said ejector elements over said edges not covered by said blockage segments.

17. A thrust reverser for a jet engine having a streamlined cover and an exit nozzle, comprising a tail section positioned at the aft end of said engine, means for moving said tail section axially between a forward stowed position and a rear extended position, said tail section being located adjacent to said cover with at least a porttion of said tail section around said nozzle when in stowed position, the movement of said tail section rearwardly from its stowed position by said moving means providing a passageway for exhaust gas between said tail section and said exit nozzle, a plurality of blockage segments pivotally supported at one end on and around a circumference of the interior surface of said tail section and extending along the inner surface of said tail section when said tail section is in stowed position, and linkage means connecting said segments to a stationary member associated with said engine for moving said segments inwardly from the extending position after a predetermined amount of rearward movement of said tail section, said circumference of said tail section being larger than the circumference of said exit nozzle so that blockage by said segments occurs over a larger area than the area of said exit nozzle.

18. A thrust reverser for a jet engine having a streamlined cover and an exit nozzle, comprising a tubular tail section positioned at the aft end of said engine, means for moving said tail section axially between a forward stowed position and a rear extended position, said tail section being located around the exit nozzle of said engine and adjacent to said cover when in the stowed position and being located aft of said exit nozzle to provide a passageway for exhaust gas between said tail section and said exit nozzle when in the extended position, a plurality of blockage segments, means pivotally supporting said blockage segments on and around the interior surface of said tail section and in positions extending along the inner surface of said tail section when said tail section is in stowed position, linkage means connecting said segments to a stationary member associated with said engine for moving said segments during a portion of the movement of said tail section, said linkage means having a movable connection for permitting said tail section to move rearwardly so as to open said passageway before said linkage means commences to move said blockage segments inwardly upon further rearward movement of said tail section to block the transverse area of said tail section and direct exhaust gas through said passageway, and shielding means connected to said tail section and movable therewith, and means for extending said shielding means from said engine responsive to rearward movement of said tail section to shield against the flow of exhaust through preselected portions of said passageway.

References Cited in the file of this patent

UNITED STATES PATENTS

| | | |
|---|---|---|
| 2,693,078 | Laucher | Nov. 2, 1954 |
| 2,697,907 | Gaubatz | Dec. 28, 1954 |
| 2,813,395 | Meyer | Nov. 19, 1957 |
| 2,839,891 | Drakeley | June 24, 1958 |
| 2,841,954 | Rainbow | July 8, 1958 |
| 2,846,844 | O'Rourke | Aug. 12, 1958 |
| 2,847,823 | Brewer | Aug. 19, 1958 |
| 2,874,538 | Laucher et al. | Feb. 24, 1959 |
| 2,886,946 | Parker | May 19, 1959 |
| 2,931,171 | Tyler et al. | Apr. 5, 1960 |
| 2,933,890 | Morrison | Apr. 26, 1960 |
| 2,950,595 | Laucher et al. | Aug. 30, 1960 |

FOREIGN PATENTS

| | | |
|---|---|---|
| 56,672 | France | July 23, 1952 |
| 1,092,654 | France | Nov. 10, 1954 |
| 1,134,418 | France | Dec. 3, 1956 |
| 740,385 | Great Britain | Nov. 9, 1955 |